(12) United States Patent
Chou

(10) Patent No.: US 10,598,889 B1
(45) Date of Patent: Mar. 24, 2020

(54) LIGHT GUIDE STRUCTURE AND LUMINOUS PAD HAVING THE SAME

(71) Applicant: Hades-Gaming Corporation, New Taipei (TW)

(72) Inventor: Hung-Jen Chou, New Taipei (TW)

(73) Assignee: HADES-GAMING CORPORATION, New Taipei (TW)

( * ) Notice: Subject to any disclaimer, the term of this patent is extended or adjusted under 35 U.S.C. 154(b) by 0 days.

(21) Appl. No.: 16/280,781

(22) Filed: Feb. 20, 2019

(30) Foreign Application Priority Data

Dec. 19, 2018 (TW) .............................. 107146003 A

(51) Int. Cl.
| | |
|---|---|
| *F21V 8/00* | (2006.01) |
| *F21V 33/00* | (2006.01) |
| *G06F 3/039* | (2013.01) |
| *G02B 6/44* | (2006.01) |
| *G02B 6/26* | (2006.01) |

(52) U.S. Cl.
CPC ......... *G02B 6/4488* (2013.01); *G02B 6/0056* (2013.01); *G02B 6/262* (2013.01)

(58) Field of Classification Search
CPC ..... G02B 6/4488; G02B 6/0056; G02B 6/262
See application file for complete search history.

(56) References Cited

U.S. PATENT DOCUMENTS

| | | | | |
|---|---|---|---|---|
| 10,216,298 B2* | 2/2019 | Chou | .................... | G06F 3/0395 |
| 10,365,422 B2* | 7/2019 | Hong | ....................... | G06F 3/039 |
| 10,393,364 B2* | 8/2019 | Chou | ................... | F21V 33/0048 |
| 10,444,418 B2* | 10/2019 | Chou | ..................... | G02B 6/005 |
| 10,488,956 B2* | 11/2019 | Chou | ..................... | F21V 33/00 |
| 2004/0224107 A1* | 11/2004 | Lewis | .................. | G06F 3/0395 |
| | | | | 428/34.1 |
| 2010/0033988 A1* | 2/2010 | Chiu | ....................... | G02B 6/001 |
| | | | | 362/619 |
| 2010/0302799 A1* | 12/2010 | Rosberg | ............... | G02B 6/0041 |
| | | | | 362/602 |
| 2011/0280036 A1* | 11/2011 | Yi | ......................... | G02B 6/001 |
| | | | | 362/551 |
| 2016/0320575 A1* | 11/2016 | Schlehahn | .......... | G02B 6/4274 |

* cited by examiner

*Primary Examiner* — Tracie Y Green

(74) *Attorney, Agent, or Firm* — Chun-Ming Shih; HDLS IPR Services

(57) ABSTRACT

A light guide structure and a luminous pad having the same are provided. The luminous pad includes a pedestal and a light guide structure disposed on the pedestal. The light guide structure includes a light guide tube, a light source module, an electrical load, and a transmission line set. The light guide tube has a wire channel and two positions. The light source module and the electrical load are individually disposed at the two positions. The light source module is electrically connected to the transmitter. The transmission line set is disposed inside the wire channel and electrically connected between the transmitter and the electrical load. Therefore, an aesthetic effect of the transmission line set not exposed outside is achieved, the light guide tube is not obstructed by the transmission line set, and the smoothness of the luminous pad is ensured.

16 Claims, 5 Drawing Sheets

LIGHT GUIDE STRUCTURE AND LUMINOUS PAD HAVING THE SAME

BACKGROUND OF THE INVENTION

Field of the Invention

The present invention relates to a light guide structure, in particular, to a light guide structure having a wire channel and a luminous pad having the light guide structure.

Description of Related Art

The reason why an additional wiring is required for the light guide strip is that an additional electrical device needs to be added besides the original light source and the light guide distance becomes longer When the additional electrical device is added, an external transmission line is required to be connected between the additional electrical device and the power source.

When the light guide distance of the luminous pad becomes longer, the light beam emitted from the original single light source cannot pass through the whole light guide strip, which causes dark zones where the light beam cannot reach and affects the luminous effect.

Therefore, the inventor proposes to add an additional light source such that the light beam emitted from the additional light source can pass through the portion where the light beam cannot reach to eliminate the dark zones.

However, another issue occurs consequently. That is if the power source electrically connected to the original light source also needs to supply power to the another light source, the only way is to connect an additional external transmission line.

Regardless of the above two reasons, once the additional external transmission line is connected, it will be exposed out of the light guide strip, which diminishes the aesthetic appearance and possibly blocks the light guide strip to affect the light output and even the smoothness of the luminous pad is affected due to the additional external transmission line.

SUMMARY OF THE INVENTION

It is an objective of the present invention to provide a light guide structure and a luminous pad having the light guide structure. The light guide structure can receive the external transmission line into the wire channel of the light guide tube.

In order to achieve the above objective, the present invention provides a light guide structure connected to a transmitter. The light guide structure comprises a light guide tube, a light source module, at least one electrical load, and a transmission line set. The light guide tube is provided with a wire channel, a first position, and at least one second position. The first position and the at least one second position are disposed separate from each other. The wire channel is formed along the light guide tube. The light source module is disposed at the first position and electrically connected to the transmitter. The at least one electrical load is disposed at the at least one second position. The transmission line set is disposed inside the wire channel and electrically connected between the transmitter and the at least one electrical load.

The present invention also provides a luminous pad having a light guide structure connected to a transmitter. The luminous pad comprises a pedestal and a light guide structure. The light guide structure is disposed on the pedestal and comprises a light guide tube, a light source module, at least one electrical load, and a transmission line set. The light guide tube is provided with a wire channel, a first position, and at least one second position; the first position and the at least one second position are disposed separate from each other. The wire channel is formed along the light guide tube. The light source module is disposed at the first position and electrically connected to the transmitter. The at least one electrical load is disposed at the at least one second position. The transmission line set is disposed inside the wire channel and electrically connected between the transmitter and the at least one electrical load.

Compared with the prior art, the present invention has the following effects. The transmission line set is not exposed outside to have aesthetic effect. The transmission line set does not block the light guide tube not to block the light beam. The transmission line set is not exposed on the bottom surface of the luminous pad and is not clamped between two adjacent structure layers of the luminous pad to ensure the smoothness of the luminous pad.

DETAILED DESCRIPTION OF THE INVENTION

To further disclose the characteristics and technical details of the present invention, please refer to the following detailed description and accompanying figures. However, the accompanying figures are only for reference and explanation, but not to limit the scope of the present invention.

Figure 2:
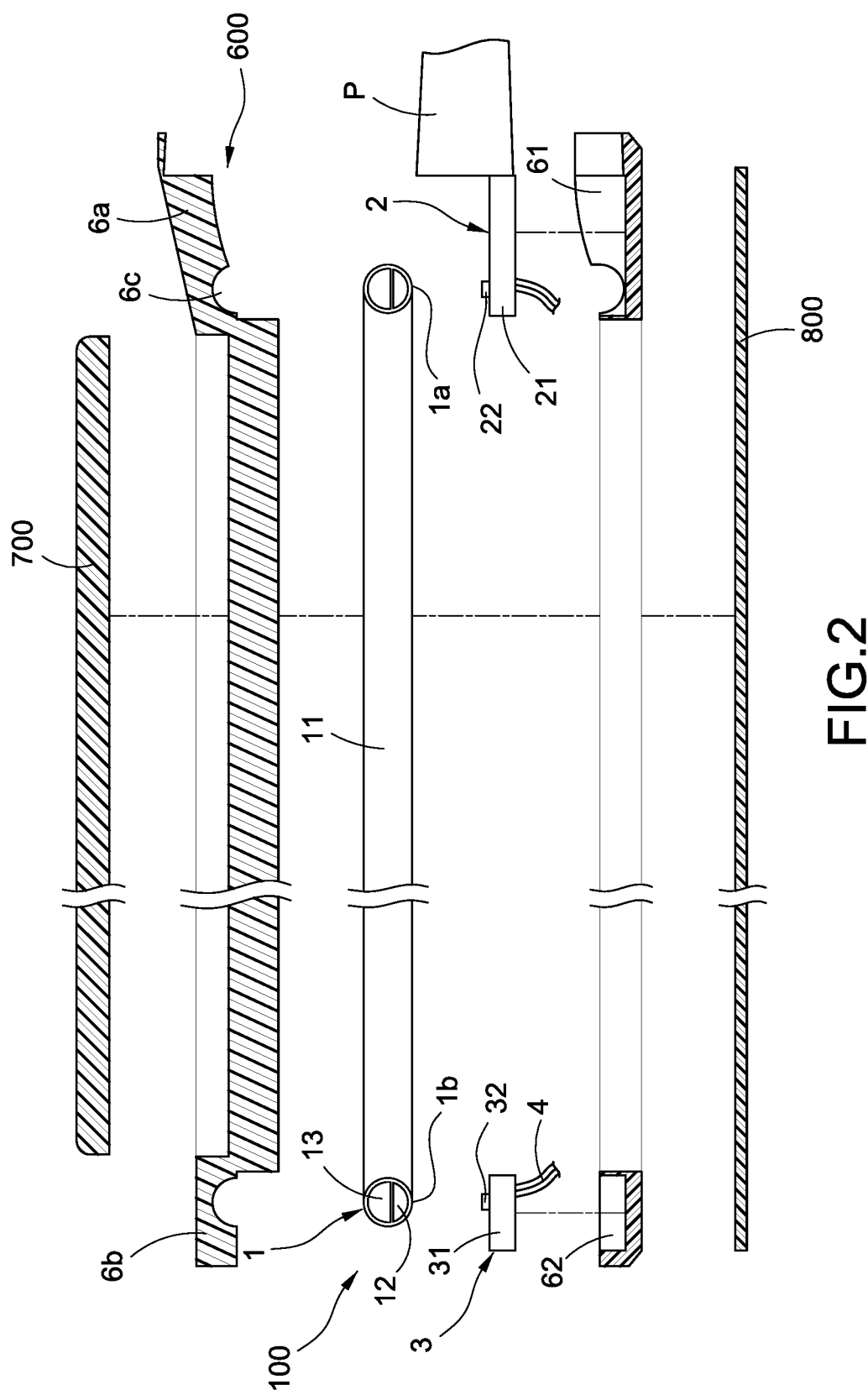
FIG. 2 is an exploded cross-sectional view of the luminous pad of the present invention.
Figure 3:
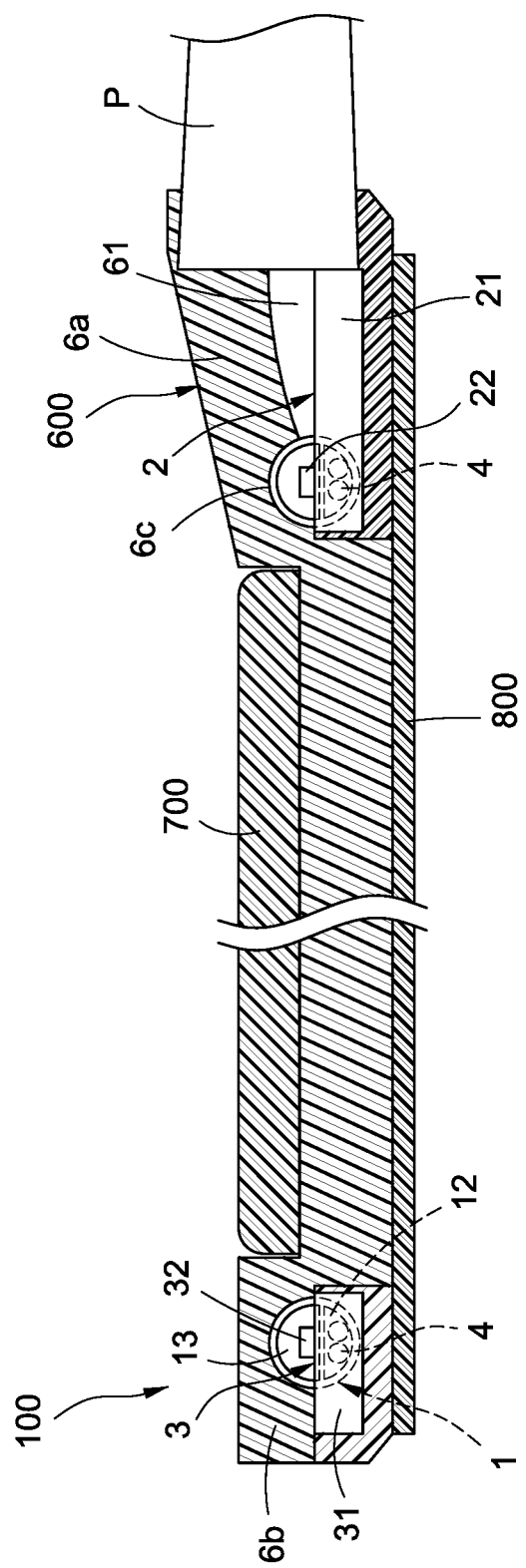
FIG. 3 is an assembled cross-sectional view of the luminous pad of the present invention.
Figure 4:
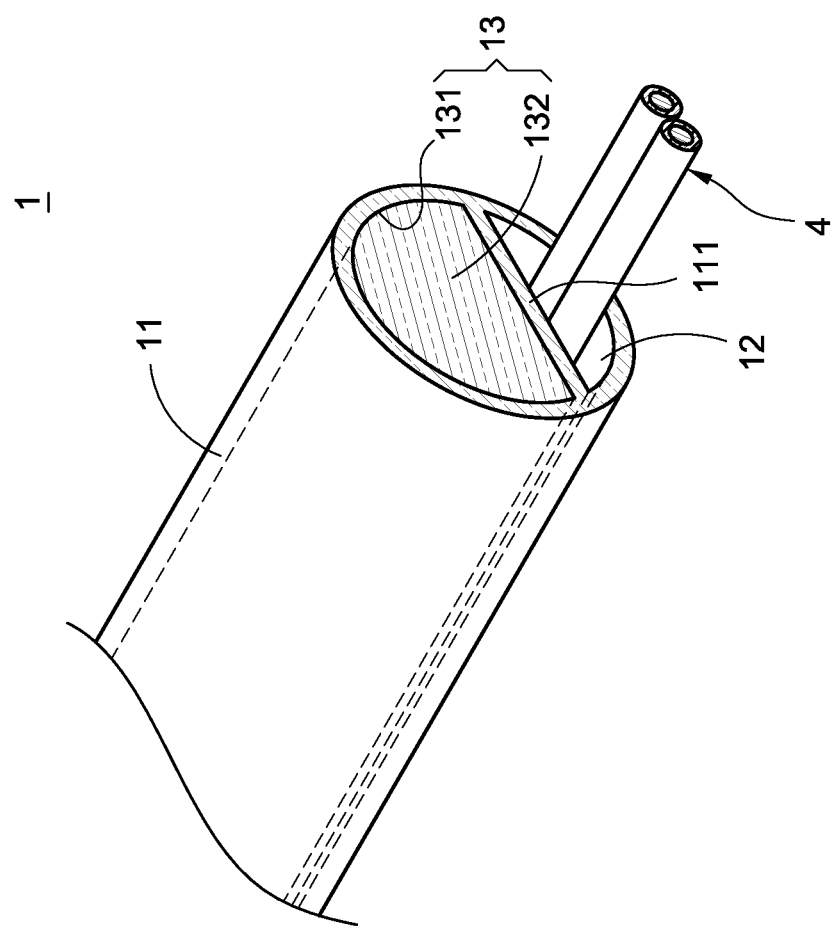
FIG. 4 is a respective cross-sectional view of the light guide tube of the present invention.

As shown in FIGS. 2-4, the present invention provides a light guide structure and a luminous pad having the light guide structure. The light guide structure 100 of the present invention is used to connected to a transmitter P which can transmit power and/or signal such that the transmitter P transmits the power and/or signal to the light guide structure 100. The light guide structure 100 comprises a light guide tube 1, a light source module 2, an electrical load 3, and a transmission line set 4. The transmitter P may be a power supply or a controller, and is not limited in the present invention.

The light guide tube 1 is mainly provided with a wire channel 12, a first position 1a, and a second position 1b. The first position 1a and the second position 1b are disposed separate from each other. The wire channel 12 is formed along the light guide tube 1. The first position 1a is preferably disposed near the transmitter P. The second position 1b is preferably disposed away from the transmitter P. Besides, the light guide tube 1 may be a bent member or a ring member having a shape of a straight line, rectangle, polygon, trapezoid, ellipse, or circle but not limited to these. The light guide tube 1 can be the fiber cable.

Preferably, as shown in FIG. 4, the light guide tube 1 comprises a tube body 11, a wire channel 12, and a light guide portion 13. The light guide portion 13 is disposed along the tube body 11. The wire channel 12 is formed along and inside the tube body 11. The light guide portion 13 is used for guiding the light beam. The wire channel 12 is used for receiving the disposed external transmission line to achieve the objective of wiring disposed inside the tube. In other words, the light guide tube 1 of the present invention has two functions of the light guide and the wiring. Also, it must be noted that the tube body 11 defines an axial line (not shown) and the wire channel 12 is disposed along the axial line inside the tube body 11.

The light guide portion 13 comprises a light channel 131 and a light guide body 132. The light channel 131 is formed along and inside the tube body 11. The light guide body 132 is disposed inside the light channel 131. In particular, the light channel 131 is also disposed along the above-mentioned axial line inside the tube body 11; the light channel 131 and the wire channel 12 are separated from each other.

Figure 1:
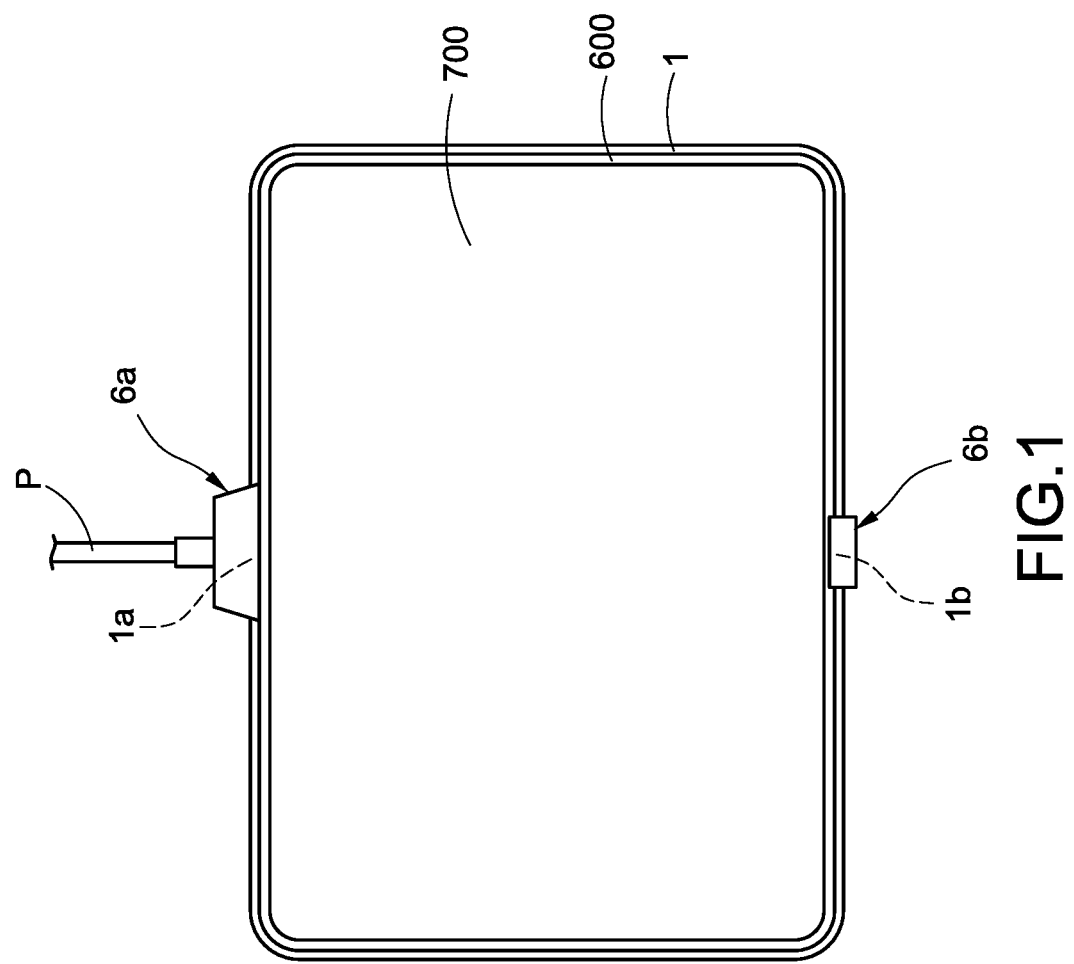
FIG. 1 is a top view of the luminous pad of the present invention.

The light source module 2 is disposed at the first position 1*a* and the electrical load 3 is disposed at the second position 1*b* such that the light source module 2 is away from the electrical load 3, as shown in FIG. 1, in which they are disposed opposite to each other with a distance. In particular, the light source module 2 comprises a circuit board 21 and a light emitting device 22 electrically disposed on the circuit board 21. The electrical load 3 may be any object requiring electrical power. Preferably, the electrical load 3 can be another light source module also comprising a circuit board 31 and a light emitting device 32 electrically disposed on the circuit board 31. The light source module 2 is electrically connected to the transmitter P such that the transmitter P can transmit power and/or signal to the adjacent light source module 2.

The transmission line set 4 comprises several external transmission lines (not labeled). The transmission line set 4 is disposed inside the wire channel 12 and is electrically connected between the transmitter P and the electrical load 3. For example, the transmission line set 4 is electrically bridged between the transmitter P and the electrical load 3. In this way, the transmitter P can transmit the power and/or signal to the distant light guide structure 100 through the transmission line set 4.

As shown in FIGS. 1-3, the light emitting device 22 of the light source module 2 and the light emitting device 32 of the electrical load 3 are disposed at the first position 1*a* and at the second position 1*b* of the light guide tube 1, respectively, and corresponding to the light guide portion 13 (refer to FIG. 3). Preferably, the light emitting devices 22, 32 are individually located at the centers of the two respective halves of the light guide tube 1 to individually guide the light beams such that the resulting light guide distance is half of the length of the original light guide distance and there are no portions where the light beam cannot reach. Thus, there are no dark zones where the light beam cannot reach in the light guide tube 1.

As shown in FIGS. 1-4, the luminous pad of the present invention comprises a pedestal 600 and the above-mentioned light guide structure 100.

The light guide structure 100 is disposed at any feasible position on the pedestal 600. For example, the light guide structure 100 can be bedded in the transparent pedestal 600. In the current embodiment, the light guide structure 100 whish is embedded in the outer surface of a transparent or opaque pedestal 600 is used for explanation. The outer surface of the pedestal 600 can be the top surface or the bottom surface of the pedestal 600, or the edge connecting the top surface and the bottom surface of the pedestal 600. The edge can be the whole edge or at least one side of the edge. The light guide structure 100 is disposed on the top surface, the bottom surface, the edge, or the combination thereof. The light guide structure 100 embedded in the edge is used for explanation in the current embodiment.

The pedestal 600 has a first fixing member 6*a* and a second fixing member 6*b*. Preferably, the pedestal 600 further has a groove 6*c*. The first fixing member 6*a* corresponds to the first position 1*a*; the second fixing member 6*b* corresponds to the second position 1*b*. Thus, the above-mentioned light source module 2 is held by the first fixing member 6*a*; the electrical load 3 is held by the second fixing member 6*b*. The light guide tube 1 is disposed in the groove 6*c*.

The first fixing member 6*a* further has a first receiving portion 61 communicating with the groove 6*c*; the second fixing member 6*b* further has a second receiving portion 62 communicating with the groove 6*c* such that the light source module 2 can be received in the first receiving portion 61 and the electrical load 3 can be received in the second receiving portion 62.

Preferably, the luminous pad of the present invention further comprises a first pad 700 and a second pad 800. The first pad 700 is stacked on the top surface of the pedestal 600 and the second pad 800 is stacked on the bottom surface of the pedestal 600 to from a three-layer structure.

Figure 7:
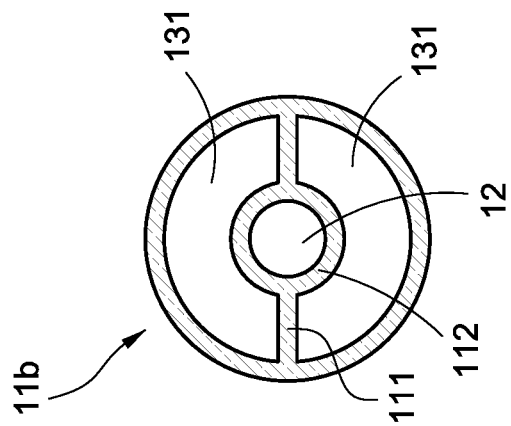
FIG. 7 is a cross-sectional view of the tube body of the light guide tube according to the third embodiment of the present invention.
Figure 6:
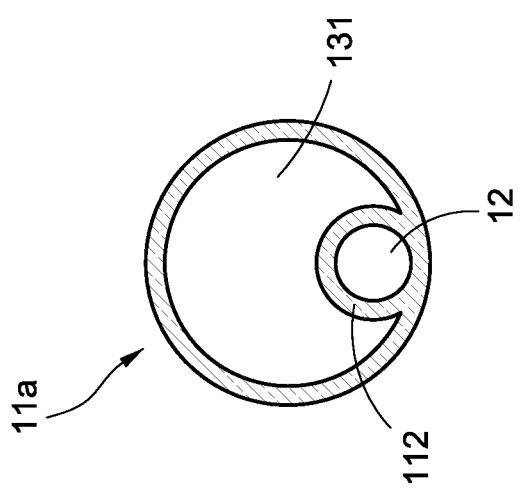
FIG. 6 is a cross-sectional view of the tube body of the light guide tube according to the second embodiment of the present invention.
Figure 5:
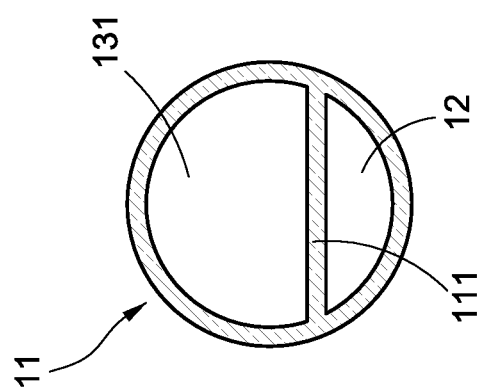
FIG. 5 is a cross-sectional view of the tube body of the light guide tube according to the first embodiment of the present invention.

FIGS. 5-7 show the tube body 11, the tube body 11*a*, and the tube body 11*b* according to the first, the second, and the third embodiments of the present invention, respectively.

As shown in FIG. 5, the first embodiment, the light guide tube 1 uses a partition 111 disposed in the tube body 11 to divide the tube body 11 into a wire channel 12 and a light channel 131.

As shown in FIG. 6, the second embodiment, the light guide tube 1 uses an internal tube 112 disposed in the tube body 11*a* to divide the tube body 11*a* into a wire channel 12 and a light channel 131.

As shown in FIG. 7, the third embodiment, the light guide tube 1 uses a partition 111 and an internal tube 112 disposed in the tube body 11*b* to divide the tube body 11*b* into a wire channel 12 and two light channels 131.

In other embodiments not shown, the above-mentioned second position 1*b*, the above-mentioned electrical load 3, and the above-mentioned second fixing member 6*b* may be single or plural in number (i.e., at least one). The transmission line set 4 is electrically connected to the at least one electrical load 3. There can be two light guide portion 13 of the light guide tube 1 disposed and thus there also should be two light emitting devices 22 and two light emitting devices 32 disposed.

In summary, compared with the prior art, the present invention mainly has the following effects. By means of the wire channel 12 disposed along the tube body 11/11*a*/11*b* inside the light guide tube 1, the transmission line set 4 comprising several external transmission lines can be received in the wire channel 12 and be electrically connected between the transmitter P and the electrical load 3. In this way, the transmission line set 4 is not exposed outside because it is bidden in the light guide tube 1) to show aesthetic effect. The transmission line set 4 does not block the light guide tube 1 because it is received and confined in the opposite portion of the light guide portion 13 not to block the light beam. The transmission line set 4 is not exposed on the bottom surface of the luminous pad and is not clamped between two adjacent structure layers of the luminous pad to ensure the smoothness of the luminous pad.

The embodiments described above are only preferred ones of the present invention and not to limit the claimed scope of the present invention. Therefore, all the equivalent modifications and variations applying the specification and figures of the present invention should be embraced by the claimed scope of the present invention.

What is claimed is:

1. A light guide structure connected to a transmitter, comprising:
    a light guide tube provided with a wire channel, a first position, and at least one second position, wherein the first position and the at least one second position are disposed away from each other, wherein the wire channel is formed along the light guide tube;
    a light source module disposed at the first position and electrically connected to the transmitter;
    at least one electrical load disposed at the at least one second position; and
    a transmission line set disposed inside the wire channel and electrically connected between the transmitter and the at least one electrical load.

2. The light guide structure according to claim 1, wherein the light guide tube comprises a tube body, at least one light guide portion, and the wire channel, wherein the at least one light guide portion is disposed along the tube body, wherein the wire channel is formed along and inside the tube body.

3. The light guide structure according to claim 2, wherein the light guide portion comprises a light channel and a light guide body, wherein the light channel is formed along and inside the tube body, wherein the light guide body is disposed inside the light channel.

4. The light guide structure according to claim 3, wherein the light guide tube uses a partition, an internal tube, or the partition and the internal tube disposed inside the tube body to divide the tube body into the wire channel and the at least one light channel.

5. The light guide structure according to claim 2, wherein each of the light source module and the at least one electrical load has a light emitting device, wherein the light emitting device of the light source module and the light emitting device of the at least one electrical load are disposed at the first position and at the second position, respectively, and corresponding to the light guide portion.

6. The light guide structure according to claim 1, wherein the light source module is a first light source module, wherein the electrical load is a second light source module.

7. A luminous pad having a light guide structure connected to a transmitter, comprising:
    a pedestal; and
    a light guide structure disposed on the pedestal and comprising:
        a light guide tube provided with a wire channel, a first position, and at least one second position, wherein the first position and the at least one second position are disposed away from each other, wherein the wire channel is formed along the light guide tube;
        a light source module disposed at the first position and electrically connected to the transmitter;
        at least one electrical load disposed at the at least one second position; and
        a transmission line set disposed inside the wire channel and electrically connected between the transmitter and the at least one electrical load.

8. The luminous pad having a light guide structure according to claim 7, wherein the pedestal has a first fixing member and at least one second fixing member, wherein the first fixing member corresponds to the first position, wherein the at least one second fixing member corresponds to the at least one second position, wherein the light source module is held by the first fixing member, wherein the at least one electrical load is held by the at least one second fixing member.

9. The luminous pad having a light guide structure according to claim 8, wherein the pedestal further has a groove, wherein the first fixing member has a first receiving portion communicating with the groove, wherein the second fixing member has a second receiving portion communicating with the groove in which the light guide tube is disposed, wherein the light source module is received in the first receiving portion, wherein the at least one electrical load is received in the second receiving portion.

10. The luminous pad having a light guide structure according to claim 7, further comprising a first pad which is stacked on the top surface of the pedestal.

11. The luminous pad having a light guide structure according to claim 7, further comprising a second pad which is stacked on the bottom surface of the pedestal.

12. The luminous pad having a light guide structure according to claim 7, wherein the light guide tube comprises a tube body, at least one light guide portion, and the wire channel, wherein the at least one light guide portion is disposed along the tube body, wherein the wire channel is formed along and inside the tube body.

13. The luminous pad having a light guide structure according to claim 12, wherein the light guide portion comprises a light channel and a light guide body, wherein the light channel is formed along and inside the tube body, wherein the light guide body is disposed inside the light channel.

14. The luminous pad having a light guide structure according to claim 13, wherein the light guide tube uses a partition, an internal tube, or the partition and the internal tube disposed inside the tube body to divide the tube body into the wire channel and the at least one light channel.

15. The luminous pad having a light guide structure according to claim 12, wherein each of the light source module and the at least one electrical load has a light emitting device, wherein the light emitting device of the light source module and the light emitting device of the at least one electrical load are disposed at the first position and at the second position, respectively, and corresponding to the light guide portion.

16. The luminous pad having a light guide structure according to claim 7, wherein the light source module is a first light source module, wherein the electrical load is a second light source module.

* * * * *